United States Patent [19]

Gurusami et al.

[11] Patent Number: 5,764,707
[45] Date of Patent: Jun. 9, 1998

[54] METHOD AND APPARATUS FOR IMPROVED PHASE SHIFT KEYED (PSK) SIGNAL DEMODULATION

[75] Inventors: Aravanan Gurusami, East Syracuse; Mike Nekhamkin, De Witt, both of N.Y.

[73] Assignee: Philips Electronics North America Corp., New York, N.Y.

[21] Appl. No.: 762,642

[22] Filed: Dec. 9, 1996

[51] Int. Cl.[6] .................................................. H04L 27/22
[52] U.S. Cl. ........................ 375/329; 375/342; 375/355; 329/304
[58] Field of Search ............................. 375/329, 330, 375/331, 332, 355, 324, 342, 340; 329/304

[56] References Cited

U.S. PATENT DOCUMENTS

| 4,896,334 | 1/1990 | Sayar | 375/344 |
| 5,241,545 | 8/1993 | Kazecki et al. | 375/342 |
| 5,465,412 | 11/1995 | Mueller et al. | 375/348 |
| 5,694,434 | 12/1997 | Burke | 375/330 |

*Primary Examiner*—Stephen Chin
*Assistant Examiner*—Betsy L. Deppe

[57] ABSTRACT

An improved method for signal demodulation, based upon the assessment of an error statistic which is independent of the content of the data stream. To determine the appropriate sampling point within a data period, multiple sampling points are utilized to generate a set of alternative decodings of the data stream. Associated with each of these alternative sets is an error statistic which is computed based upon a known characteristic of the transmitted stream. For example, in Differential QPSK, the encoded phase change is known to be a multiple of 90 degrees. The error statistic would be a function of the difference between each sampled phase and the nearest multiple of 90 degrees. This error statistic provides a quantifiable measure of quality and noise margin associated with each sampling point. The decoded stream associated with the error statistic of highest quality is then selected as the proper decoding of the transmitted data stream. This invention is particularly well suited for processing small data packets, such as ATM.

13 Claims, 8 Drawing Sheets

METHOD AND APPARATUS FOR IMPROVED PHASE SHIFT KEYED (PSK) SIGNAL DEMODULATION

BACKGROUND OF THE INVENTION

1. Field of the Invention

This invention generally relates to signal transmission and processing, and specifically to a method and apparatus for demodulating Phase Shift Keyed (PSK) signals. It is particularly applicable for reliable and robust communication of small data packets, as would typically be employed in multiple access protocol networks.

2. Discussion of the Related Art

Phase Shift Keyed (PSK) modulation is particularly efficient for the transmission of digital data. In PSK modulation, a data unit's value is encoded in the phase of a carrier signal. For example, in a binary system, a data unit value of zero may be encoded as a phase of zero degrees, and value of one may be encoded as a phase of 180 degrees. In a quadrary system, data values of 00, 01, 11, and 10 may be encoded as phases of 45, 135, 225, and 315 degrees. To decode the data unit from the received PSK modulated signal, the phase of the signal must be compared to the phase of the reference carrier signal at the transmitter. This reference signal is often derived at the receiver by locking onto the carrier frequency with, for example, a phase locked loop (PLL) circuit. The output of the locked PLL will be at the frequency of the carrier, with a fixed phase relation to the transmitter's reference signal. Locking onto the carrier signal can be a time consuming process. Increasing the speed at which lock is achieved has the adverse effect of increasing the sensitivity of the lock to noise. Deriving the absolute phase from the signal also results in a phase ambiguity, because it is impossible to determine which of the received phases actually correspond to the reference phase at the transmitter. To provide for locking and to establish a receiver reference phase to correspond to the transmitter's reference phase, a preamble sequence of known data is transmitted before the actual message content.

Differential PSK modulation overcomes the need to establish a reference phase. The data unit value is encoded as a change of phase, rather than a specific phase. That is, for example, in a binary system, a data value of zero might be encoded as no change in phase, whereas a data value of one would be encoded as a 180 degree change in phase. That is, a data series of 111001 would be encoded as a series of three changes of phase, followed by two periods with no change in phase, followed by a change of phase. Note that, in the prior statement, the actual phase was irrelevant; regardless of the initial phase, three changes would be decoded as 111. To detect the appropriate number of "non-change" of phase, a nominal data period is assumed. Thus, the absence of a change of phase for two data periods correspond to a 00 data pattern. A similar change of phase encoding can be employed for trinary, quadrary, and higher data unit types.

Differential PSK modulation and the corresponding differential PSK demodulation provide advantages compared to absolute PSK modulation and demodulation. By employing differential modulation and demodulation, the receiver does not have to lock to the transmitter, nor does the receiver need to receive a reference known signal. The carrier does need to exist prior to the first encoded data item, so that a change of phase may be detected, but no specific data sequence need be transmitted.

Differential modulation and demodulation, however, significantly increase the potential error rate. An error in determining the change of phase for one data unit will affect that data unit, as well as the next data unit. That is, for example, in the above binary encoding, if three changes were transmitted, and any one change was not detected, the next change will appear to be a non-change to the apparently unchanged phase, or, the next non-change will appear to be a change. Because of this doubling of errors, absolute PSK modulation is often preferred in environments with a high likelihood of error, such as caused by noise and other interferences. As noted, however, absolute phase demodulation is typically more time consuming, or more costly, than differential phase demodulation.

Although differential modulation, ideally, eliminates the need to establish an absolute phase reference, errors can be introduced due to a difference in data periods and/or sampling times between the transmitter and receiver. Typically, the receiver will determine the phase of the received signal by sampling at an appropriate point in each data periods. An appropriate sampling point is typically one far from the transition points between data periods, so as to be representative of the true data value. For proper demodulation, the appropriate sampling point will require a processing of the signal to determine a relatively stable portion within the data period, and will require the receiver and transmitter to maintain a substantially equivalent data frequency. To establish this initial sampling point, traditional differential PSK encoded protocols append a preamble of known content to each data message.

Overall, even though differential PSK modulation and demodulation allow for a reduction in the required synchronization between transmitter and receiver, traditional demodulation techniques still require the transmission and decoding of a preamble, and are characterized as having significantly higher error rates than non-differential techniques. Also, because the preamble is used as a basis for decoding the subsequent message, any errors in establishing this basis will be reflected as an increase in the probability of error in decoding the actual message.

Also relevant to this invention, there is an increasing need for efficient and effective protocols for Multiple Access networks: networks comprising multiple transmitters to a common receiver or set of receivers. In such networks, it is often desirable to have each transmitter transmit short message packets, so that the latency time between transmission from the same transmitter is minimal. This minimizes the storage requirements in each transmitter, as well as minimizing any perceived delays, or gaps, in the transmission of multiple packets. In such networks, it is important to minimize the overhead, i.e. non-message content, of each packet, and it is important to allow for differences among transmitter characteristics. In such an environment, a demodulation technique which requires a long time to lock to a transmitter will be ineffective, because the time each transmitter transmits is required to be small. Similarly, a demodulation technique which requires a close correspondence between transmit and receive frequency or phase will be ineffective because there will be a variance among the characteristics of the individual transmitters, or their transmission paths.

SUMMARY OF THE INVENTION

This invention discloses the use of carrier independent and preamble independent PSK demodulation for improved performance under noise conditions. Although Differential PSK (DPSK) demodulation is traditionally inferior to absolute phase PSK demodulation in terms of error rate, DPSK by the use of this invention is shown to be well suited for noise affected environments. This invention is suited for absolute phase modulation, as well other forms of modulation, as will be discussed.

In accordance with this invention, demodulation is performed by accumulating a majority of the packet symbols and choosing a correct sample point for determining phase, or phase changes, based on a minimum error technique. The use of this invention avoids the errors which would be introduced by a carrier phase shift in an absolute phase PSK demodulation scheme, as well as decoding errors which would be introduced by a determination of phase based on a received subset, e.g. preamble, of the received packet. This invention also accommodates transmissions from multiple transmitters, with differing transmission characteristics, by allowing for effective demodulation of the received packet from each transmitter based solely and substantially upon the received packet from that transmitter, independent of the characteristics of any other transmitter.

DETAILED DESCRIPTION OF THE PREFERRED EMBODIMENT OF THE INVENTION

Figure 1:
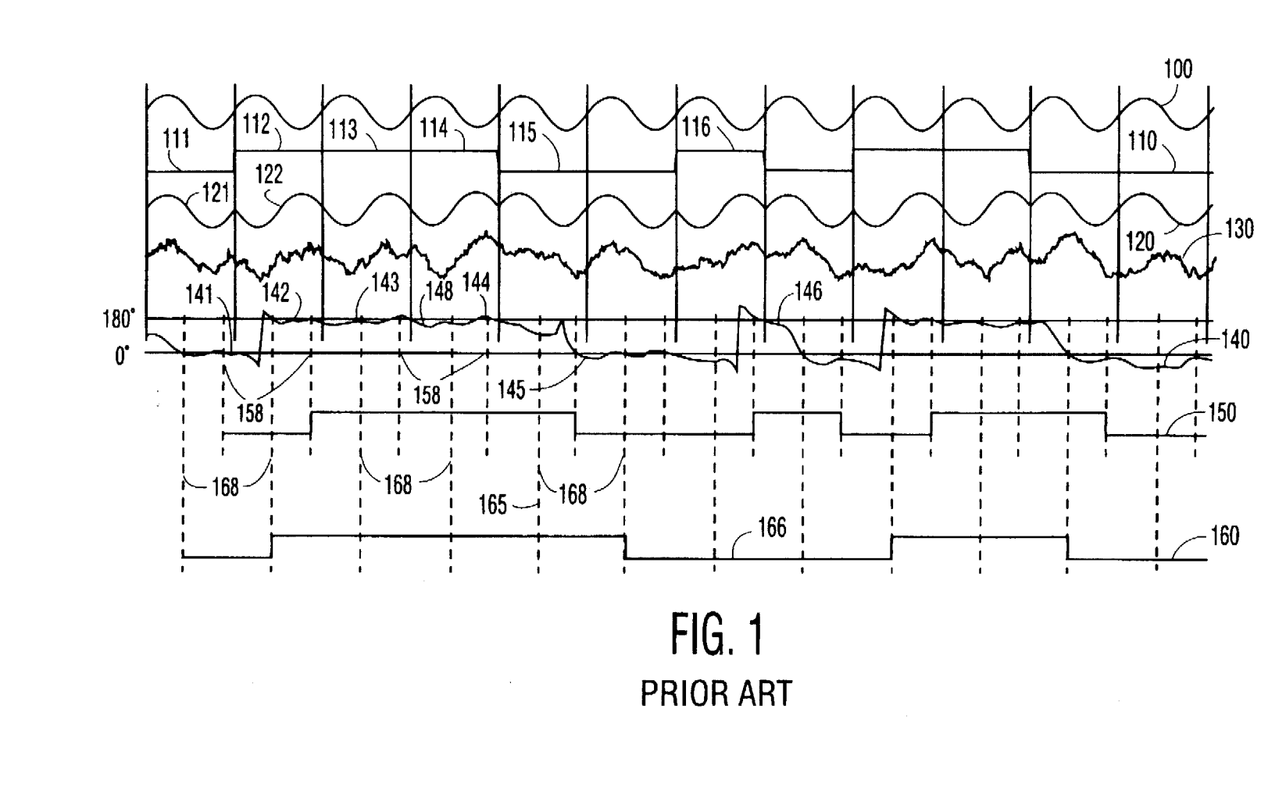
FIG. 1 shows the modulation of an absolute encoded Binary PSK signal, a received phase pattern, and two alternative demodulation results as may be determined by prior art demodulators.

FIG. 1 shows the phase encoding of a binary data pattern using absolute phase. The carrier signal is shown as the time varying sinusoidal signal 100. The data stream to be encoded is shown as signal 110. The encoded signal, the modulated PSK signal, is shown as signal 120. In this example, if the data signal is low, the encoded signal 120 will be in phase with the carrier 100; if the data signal is high, the encoded signal will be 180 degrees out of phase with the carrier. This is shown by a low data signal at 111, and a corresponding in phase signal at 121; and a high data signal at 112, and a corresponding out of phase signal at 122. Note that in this encoding, the phase of the encoded signal is either 0 degrees or 180 degrees, and the phase does not assume any values between these two values.

Signal 130 is a representation of the encoded signal 120 after being affected by noise and other interferences during transmission. The detected phase of this signal, relative to an assumed or determined carrier, as discussed above, is shown as signal 140. As would be expected, there is a strong similarity between the data stream 110 and the detected phase signal 140, as shown by phase segments 141, 142, . . . . 146 corresponding to data segments 111, 112, . . . 116, respectively. Due to noise and other interferences, however, the detected phase signal 140 does not sharply nor consistently transition between the two encoded phases of 0 and 180 degrees. And, due to noise or other factors, the detected phase may vary, as shown at 148, even though the encoded phase is constant.

The conversion of this non binary valued phase signal into the required decoded binary signal is traditionally accomplished by sampling the received phase at a fixed interval corresponding to the carrier phase. If the phase is below the midpoint between 0 and 180 degrees at this sample point, the decoded data value is asserted as low, and if the phase is above the midpoint between 0 and 180 degrees at this sample point, the decoded data value is asserted as high. The sampling point is specified as a time relative to the start of a reference periodic signal, and the signal is sampled at this same time within each subsequent reference signal period. This reference signal should have the same period as the data signal period. The choice of this sampling point is crucial to the proper decoding of the received phase encoded signal. Choosing a proper sampling point 158 results in the decoding of the received phased encoded signal 140 into an accurate representation of the original data stream. As shown, decoded stream 150 is identical to data stream 110, merely shifted in time. As shown by signal 160, however, choosing an improper sampling point 168 results in an inaccurate decoding of that same received phase encoded signal 140; decoded signal 160 is significantly different than the encoded data stream 110.

Traditionally, to determine the proper sampling point, the data stream will contain a known pattern as a preamble to the actual data message. The sampling point is adjusted until the decoded stream is identical to the known pattern. For example, if the first five data values 111 through 115 comprised the preamble, the receiver would know, a priori, that the first five decoded values must correspond to a 0-1-1-1-0 pattern. Applying an improper sampling point 168 would produce a 0-1-1-1-1 pattern, whereas applying a proper sampling point 158 would produce the required 0-1-1-1-0 pattern. The repetitive occurrences of this determined sampling point 158 would then be used to decode the subsequent data message. As noted in the discussion of the prior art, this determination of the proper sampling point can be time consuming, and the subsequent decoding based on this determination is highly dependent on the quality of this determination, as well as any potential subsequent phase shifts or frequency variance between the transmitter's carrier and the receiver's reference carrier. If, for example, a noise spike caused the fifth sample at 165 to be below the midpoint, sampling point 168 would have produced a 0-1-1-1-0 pattern. If the receiver uses this sampling point, the subsequent data would be inaccurate, as shown by decoded value 166 as compared to the original data 116.

Figure 2:
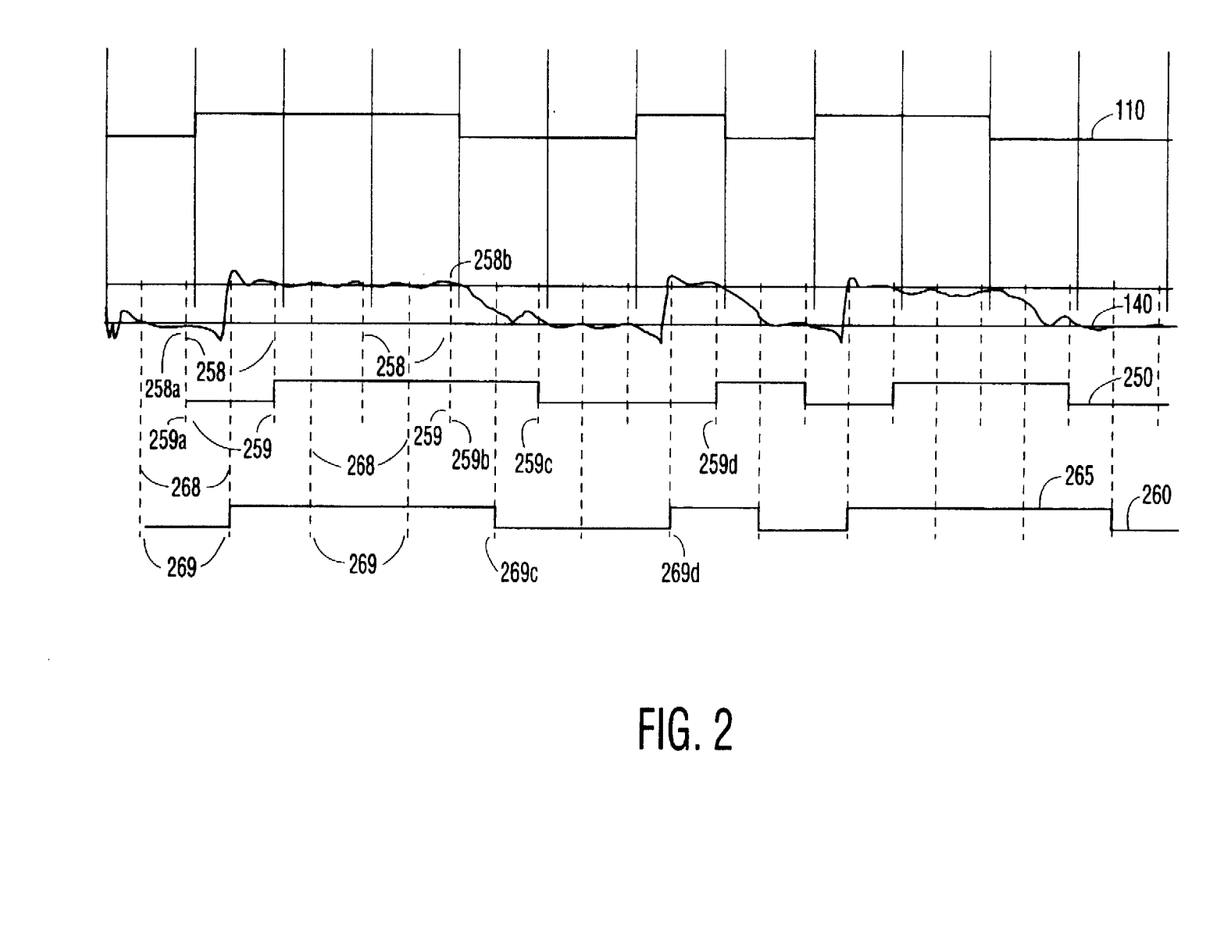
FIG. 2 shows the modulation of an absolute encoded Binary PSK signal, a received phase pattern, and demodulation results in accordance with this invention.

It is the object of this invention to produce a more reliable and robust determination of the proper sampling point for decoding the received phased signal. Shown in FIG. 2 is the original data stream 110, the detected phase signal 140, and a set of decoded streams in accordance with this invention. FIG. 2 also shows a decoded stream 250 which is formed if sampling points 258 are used. Also shown immediately below each sampling point 258 are measures of error 259 associated with that sampling point. These measure are based on a comparison with the decoding of an ideal received phase signal. Ideally, the detected phase should be either 0 or 180 degrees. When the phase is sampled at 258a, however, the phase is below 0. The amount this phase is below zero is shown by error vector 259a. Similarly, when sampled at 258b, the phase is above 180. The amount this phase is above 180 is shown by error vector 259b. The decoded string 250 corresponds to the determination of whether each sampled point is above or below the midpoint, as in the traditional method, but now associated with that decoded string 250 is a measure of the quality of that decoding, corresponding to the error vectors 259. Note that these error vectors are not related to values of the original data stream 110; they are a comparison to the values that the phase is constrained to assume in the encoding of the data stream, in this case, either 0 or 180 degrees.

Decoded stream 260 corresponds to the application of sampling points 268 to the received phase signal 140. Difference vectors 269, from the ideal 0 and 180 degrees, are shown below each sample point. Note that, although the decoded stream 260 is identical, initially, to decoded stream 250, the errors associated with sampling points 268 are significantly larger than those associated with sampling points 258, for example, at 269c and 269d, compared to 259c and 259d. Visually, it is apparent that sampling points 268 occur "too soon" relative to the overall detected phase signal. The error vectors 269 provide for a quantifiable measure of this improper sampling. If sampling points 268 were used for subsequent data decoding, the error rate would be higher than that which would be produced by using sampling points 258, because only a slight change in phase would cause sampling points 268 to decode an improper value, as shown at 265. In the example given above for a traditional method with a preamble of 0-1-1-1-0, sampling points 268 would have produced a proper preamble decoding, but would have subsequently generated erroneous data symbols. By utilizing the error vectors, however, ampling point 258 can be quantifiable determined to be a better choice than 268.

Note that it is the assessment of the error vectors which leads to the determination that the decoded values are inaccurate, rather than the aforementioned, somewhat unreliable, comparison of the decoded values to a known pattern. To assess these error vectors quantifiably, the sum of the magnitudes of the error vectors can be used, or the sum of the squared errors, or any other comparable statistic. Statistical tests, such as the Chi-Square test, or others may be utilized to determine the significance of the difference betweens such measures, or to determine the number of samples required to reliably detect the optimal sampling point. In the preferred embodiment, for computational ease, the sum of the magnitude of the errors is used to assess the quality of the decoded stream.

In accordance with this invention, a number of decoded streams will be produced simultaneously, each corresponding to the application of differing sampling points. Associated with each of these decoded streams will be the accumulation of error vectors, the sum of the magnitude of errors at each sample point compared to the ideal phase values of 0 and 180 degrees. From this set of decoded streams, the one with the least sum of errors will be determined to be the most accurate representation of the original data stream. Ideally, depending on the size of memory available for the storage of the alternative decoded streams and their sum of errors, the entire data message will be processed in this manner. In so doing, any variance in the frequency or phase relationship between the transmitter's carrier and the receiver's assumed carrier will be accounted for with regard to the entire data message. The memory requirement is equal to the number of bits of data in the data message times the number of sets of alternative decoded streams, plus the storage for a sum of errors associated with each alternative decoded stream. Typically, the number of alternative sets will be determined in dependence upon the variance expected as a function of the sampling point. For example, if the received phase signal is expected to be fairly distortion free, determining a sampling point within ±60 degrees may be sufficient, and hence 6 sets of alternative decoded streams will be produced, each corresponding to a sampling point 60 degrees (360/6) offset from the prior stream. If the received signal is expected to be significantly distorted, more closely spaced sampling points may be utilized. For the preferred embodiment, 16 sets of alternative decoded streams are produced, corresponding to a sampling point precision of 22.5 degrees (360/16). Preferably, the entire data packet will be processed to produce 16 alternative decoded data packets. The production of 16 sets of ATM packets, which contain 53 bytes, would require 16 times 53 bytes, plus the storage of 16 sums, for a total of less than 1 kilobyte. From this set of 16 decoded packets, the one with the least accumulated error will be determined to be the one which is the most accurate representation of the 53 bytes originally encoded. If the storage is not available for processing the entire packet, a subset of the data packet can be used. After selecting the set with the least accumulated error in this subset, the sampling point associated with that set can be utilized for the decoding of the remainder of the packet. If the data packet is extremely long, it may also be processed as a group of subpackets, wherein each subpacket is selected from the set of 16 alternative subpackets, then the process can be repeated for the next subpacket.

Consistent with this invention, the processing of subsequent packets or subpackets can be made to be dependent upon the determination of the proper phase from the prior packet or subpacket, with a repeatedly finer resolution of the proper phase. That is, absent a priori knowledge of the proper phase, the sets of decoded streams previously described correspond to equally spaced phases across the entire 360 degrees of possible phase angles. If the approximate proper phase is known, these sets could be spaced closely about this approximate value, and phases far from this approximate phase could be ignored. Similarly, consistent with this invention, the number of alternative decoded sets can be reduced once the approximate proper phase is determined, or, based upon the results of a statistical analysis, such as a sequential estimation process.

Figure 3:
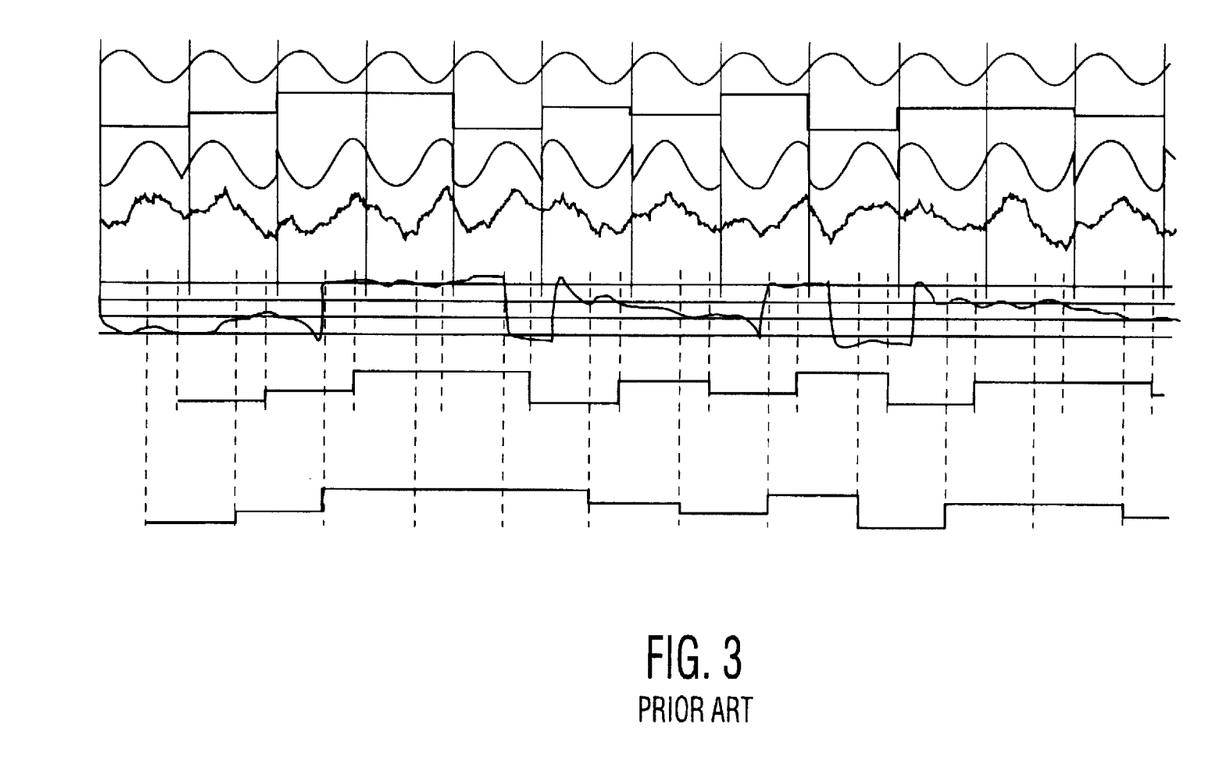
FIG. 3 shows the modulation of an absolute encoded Quadrature PSK signal, a received phase pattern, and two alternative demodulation results as may be determined by prior art demodulators.
Figure 4:
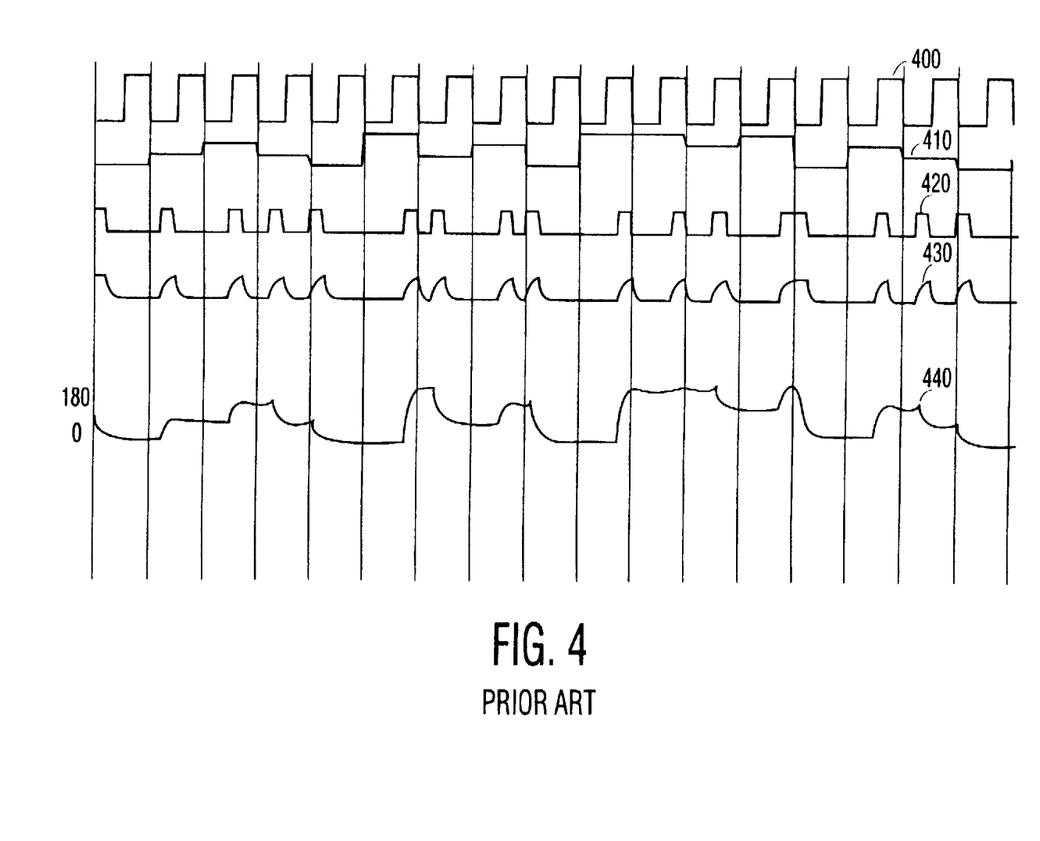
FIG. 4 shows the modulation of an absolute encoded Pulse Position Modulated (PPM) signal, and a received phase pattern.

FIG. 3 shows a form of a Quadrature phase encoded signal. The data stream 310 consists of symbols which may have one of four values, shown on line 3b as four possible levels, hereinafter referred to as data values 0, 1, 2, and 3, respectively, even though the actual data being encoded may not directly correspond to the numerical values of 0, 1, 2, or 3. Each of the four values are encoded by one of four possible phase angles relative to the carrier 100. For optimal performance, quadrature phase encoded signals are separated by ninety degrees. As shown in FIG. 3, the lowest level data signal 311 corresponds to a phase shift of −135 degrees, shown at 321. The next higher level signal 312 corresponds to a phase shift of −45 degrees, shown at 322. The next higher signal 316 corresponds to a phase shift of 45 degrees, shown at 326. The highest level signal 313 corresponds to a phase shift of 135 degrees, shown at 323. There are alternative methods of encoding four valued data symbols into quadrature phase signals, well known to those skilled in the art. The specific encodings of data symbol to phase angle is insignificant to this invention. For example, an alternative encoding could employ a Pulse Position Modulation (PPM) signal, wherein the position of the pulse within each clock cycle represents the data symbol, as shown in FIG. 4, wherein signal 400 represents the carrier, 410 represents the data stream, 420 represents the PPM encoded signal, 430 represents the received PPM encoded signal, and 440 represents the detected phase of that received signal.

In each of the particular encodings, the significant feature is that the phase of the signal is known to assume one of four possible values, and the encoded signal does not assume any other phase value. FIG. 3 shows the received signal 330, and the phase 340 of that signal, relative to an assumed carrier signal phase. Similar to the received binary phase signal 140 of FIG. 1, the received quadrature phase signal 340 is similar in form to the original data stream 310. Phase segment 341 corresponds to data value 311, 342 corresponds to 312, 343 to 313, and 346 to 316. Note, however, that the phase of the received signal exhibits intermediate values, such as segment 349, which are not present in the original data stream 310. The accurate determination of the original quandary data stream, as in the binary case discussed above, requires that the received phase signal be sampled at the proper sampling points, so as to avoid the erroneous decoding as might occur if sampled while the phase is at an intermediate value. Signal 350, based upon sample points 358, represents a proper decoding; as can be seen, decoded stream 350 is identical to the encoded data stream 310, shifted in time. Signal 360, based on sampling points 368, represents an improper decoding, because the sampling point is occurring too soon in each period.

Figure 5:
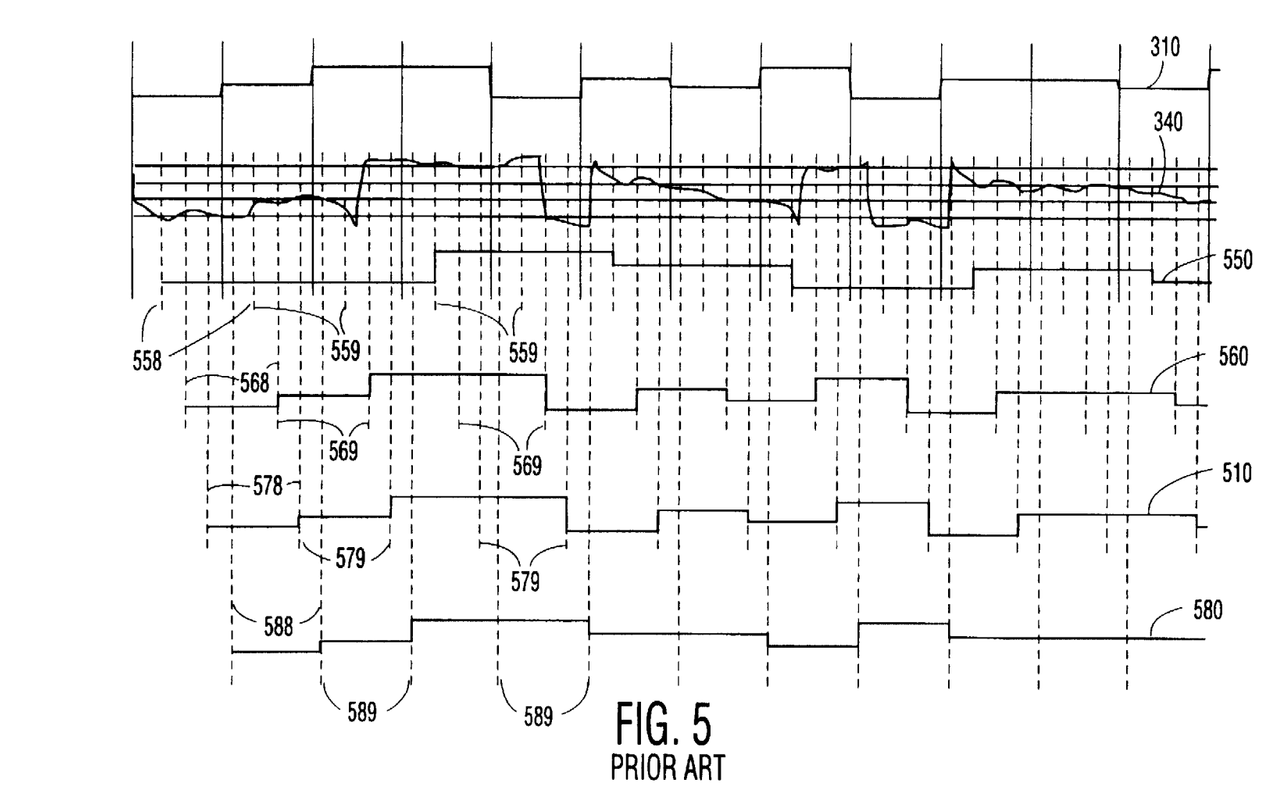
FIG. 5 shows the modulation of an absolute encoded Quadrature PSK signal, a received phase pattern, and demodulation results in accordance with this invention.

FIG. 5, similar to FIG. 2, shows the original quandary data stream 310, the received phase signal 340, and a set of decoded streams, each corresponding to different sampling points. As shown, sampling point 568 and 578 are proper sampling points, whereas 558 and 588 are not. That is, utilizing sampling points 568 or 578 result in decoded streams 560 and 570 which are accurate representations of the original data stream 310, whereas streams 550 and 580 are erroneous decodings. Also shown in FIG. 5 are error vectors 559, 569, 579, and 589 corresponding to sampling points 558, 568, 578, and 588, respectively.

The decoding and error measurement is produced as follows. The received phase signal's range is divided into four segments, each segment is centered about each of the four possible encoded phases. In the example given, with encoded phases of −135, −45, 45, and 135 degrees, corresponding to data symbols 0, 1, 2, and 3, the segments would extend from −180 to −90, −90 to 0, 0 to 90, and 90 to 180 degrees. The decoded signal will be dependent upon which segment the detected phase lies. An ideally transmitted signal would produce a phase signal which only assumed one of the four encoded phases. Therefore, a phase which differs from one of these encoded phases is in error, and the amount of error is measured by the difference between this phase and the closest ideally encoded phase value. That is, a detected phase of 49 degrees is decoded as a data value of 2 and has a 4 degree error, corresponding to an ideally transmitted phase of 45 degrees corresponding to an encoded data value of 2. Angular differences, relative to a 360 degree period are utilized to measure phase errors. A detected phase of 203 degrees is decoded to a data value of 0 and has a −22 degree error relative to an ideal 225 (equivalent to −135) degree phase. These differences, relative to the closest one of four transmitted phase values are shown as error vectors 559, 569, 579, and 589. As can be seen, vectors 559 and 589 are significantly larger than vectors 569 and 579, providing an indication that, in all likelihood, decoded streams 550 and 580, which correspond to these higher error vectors, are erroneous. Note that, in accordance with this invention, this determination that 550 and 580 are of lower quality than 560 and 570 is based on a comparison of the detected phase angle to the set of encoded phase values, without regard for the particular data values transmitted.

In accordance with this invention, a set of decoded streams will be simultaneously processed, each based on a different sampling point within the data period. The sum of the magnitude of the errors will be accumulated for each decoded stream, and the stream with the least error will be selected as the most accurate representation of the original data stream.

Note that, as presented above, a bias in the phase reference will affect the accumulated error. That is, for example, if the receiver's reference phase was 10 degrees different than the carrier's phase, the above 4 and −22 degree errors would actually be either 14 and 12 degree errors, or −6 and −32 degree errors, depending upon whether the receiver lagged or lead the carrier. Traditional bias-correcting techniques for statistical measures can be applied, consistent with this invention, or, in the preferred embodiment, a differential technique is employed. In the preferred embodiment, the first sampled point in each set is set as a reference, i.e. a sample having 0 error. From this reference, the four segments are determined, one of the segments having this referenced sample as its center, and each other segment being separated from this reference by a multiple of 90 degrees. Thus, a receiver reference phase is not required.

Note also, however, that for an absolute phase encoding, as discussed thus far, a correlation between the received phase and the carrier phase must be established in order to properly decode the data values. For example, if the first sample is set as the reference, it is necessary to determine whether this first sample corresponded to a data value of 0, 1, 2, or 3, or, equivalently, whether this detected phase corresponds to a −135, −45, 45, or 135 phase, relative to the original carrier. In the preferred embodiment, if absolute phase encoding is utilized, only one unit of known information from the transmitter is required to properly decode with minimal error.

Figure 6:
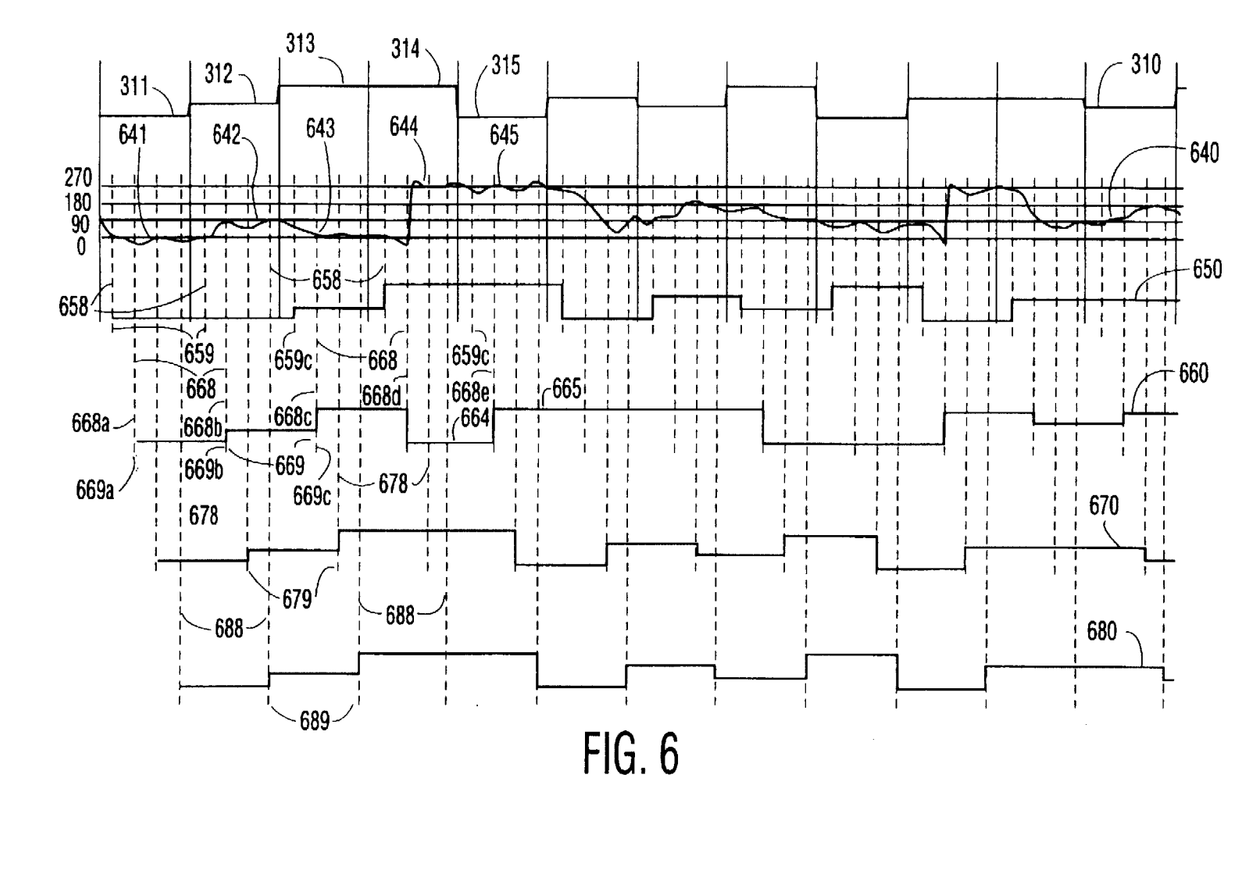
FIG. 6 shows the modulation of a differentially encoded Quadrature PSK signal, a received phase pattern, and demodulation results in accordance with this invention.

As noted in the discussion of prior art, differential phase encoding eliminates the need to establish a reference between the transmit carrier phase and the received phase. This invention is particularly well suited for differentially encoded signals. FIG. 6 shows a differential quadrature phase encoded signal. In this figure, the change of phase from one sample to the next is indicative of the encoded data value. A data value of one is encoded as a 90 degree phase shift from its prior value; a data value of two is a 180 (equivalently, −180) degree phase shift; a data value of three is a 270 (equivalently, −90) degree phase shift. Thus, in FIG. 6, the received signal 640 displays an approximate 90 degree phase shift between periods 641 and 642, corresponding to a data value of one, the encoded data value at 312. Between 642 and 643, the signal undergoes an approximate −90 degree phase shift, corresponding to a data value of 3, the encoded data value at 313. Likewise, between 643 and 644, another −90 degree phase shift occurs, corresponding to another data value of 3, the encoded data value at 314. Between 644 and 645, no phase shift occurs, corresponding to a data value of 0, at 315. As shown, the detected phase sequence 640 is not similar to the original data stream 310, rather, the changes in the detected phase signal 640 are representative of the data stream 310.

Proper decoding of this detected phase signal 640, as in all the prior examples, requires the proper selection of sampling points. FIG. 6 shows a set of decoded streams, each based on a different series of sampling point. Sampling points 668 decode an inaccurate representation 660 of the data stream 310, whereas sampling points 658, 678, and 688 decode accurate representations 650, 670 and 680 of the data stream. Note the compounding effect an error in the processing of differentially encoded signal produces. The detected phase change at 668a is in error; the detected phase at 668b is correct, but, since the prior phase was in error, the detected phase change of this correctly determined signal is in error. That is, a single phase detection error caused two phase change detection errors, as shown at 664 and 665.

In accordance with this invention, errors, relative to a change of phase of 0, 90, 180, and 270 degrees are shown at 659, 669, 679, and 689. Again, the change of phase of an ideal signal is known to be a multiple of 90 degrees; any difference from a multiple of 90 is accumulated as the measure of error in the sampling points. In accordance with this invention, this error can be accumulated relative to each difference between each sample's phase, or as the difference of each phase relative to a referenced first sample. For example, a sampled phase sequence of 0-85-280-180-260, if compared to the first sample of 0 would demonstrate a −5, +10, 0, −10 sequence of errors. If compared to each preceding phase, the same sequence would result in an error sequence of −5, +15, −10, 0. Either differential error method will be effective. The latter is less sensitive to biases on the first sample, but each phase error has a compound effect on the accumulation of the magnitude of the errors. Again, conventional measures for correcting statistical measures for biases and compounding effects can be applied, if a higher degree of precision is required. In the preferred embodiment, for computational ease, the first sample in each set is established as a reference, and all phase changes are relative to this reference. Thus, for example, signal 660 is initially sampled at 668a, and exhibits a phase value below the reference 0 degree line. At 668b, it exhibits a phase value below the reference 90 degree line; at 668c, it exhibits a phase value above the reference 0 degree line. Relative to the first sample at 668a, the error at 668c is the sum of the amount the sample at 668c is above the 0 degree line, plus the amount the sample at 668a is below the 0 degree line.

As in the binary case, the preferred embodiment for quandary data phase encoded signals, whether absolutely or differentially encoded, is to process the entire data packet to determine the alternative decoded stream which exhibits the least error across the entire data packet. This technique however can also be applied to determine a sampling point to be used for subsequent decoding of a long data packet. In the example shown in FIG. 6, although signal 650 is an accurate representation of the data signal 310, it exhibits a number of large errors, shown for example at 659c. Had the noise been slightly greater so as to reduce the phase at this sample point, the decoded value would have been in error. Thus it is seen that the measured error is also an indication of the noise margin associated with each of the sampling points. Selecting the sampling point with the smallest accumulated errors is equivalent to selecting a sampling point with the highest noise margin. If the decoded data value alone was used, as in the prior art methods, to determine the sampling point for subsequent decoding, this low noise margin sampling point 658 may have been selected.

In accordance with this invention, the memory requirements are the same as in the binary case: the size of the packet times the number of alternative decodings in the set, plus the accumulated sum of errors for each alternative decoding. In the preferred embodiment, 16 sets are utilized, thereby providing for a 22.5 degree resolution with regard to the proper sampling point.

Although the embodiments thus far discussed have addressed sampling within a data period to determine phase, the principles of this invention are not limited to phase detection only. Any demodulation scheme which requires the determination of an appropriate periodic sampling point may be suitable to the methods discussed herein, if there is a parameter of the encoded signal which can be discretely identified, independent of the encoded data value. The use of phase samples illustrates the principles of the invention. It will be appreciated that those skilled in the art will be able to devise various arrangements which, although not explicitly described or shown herein, embody the principles of the invention and are thus within its spirit and scope.

Figure 7A:
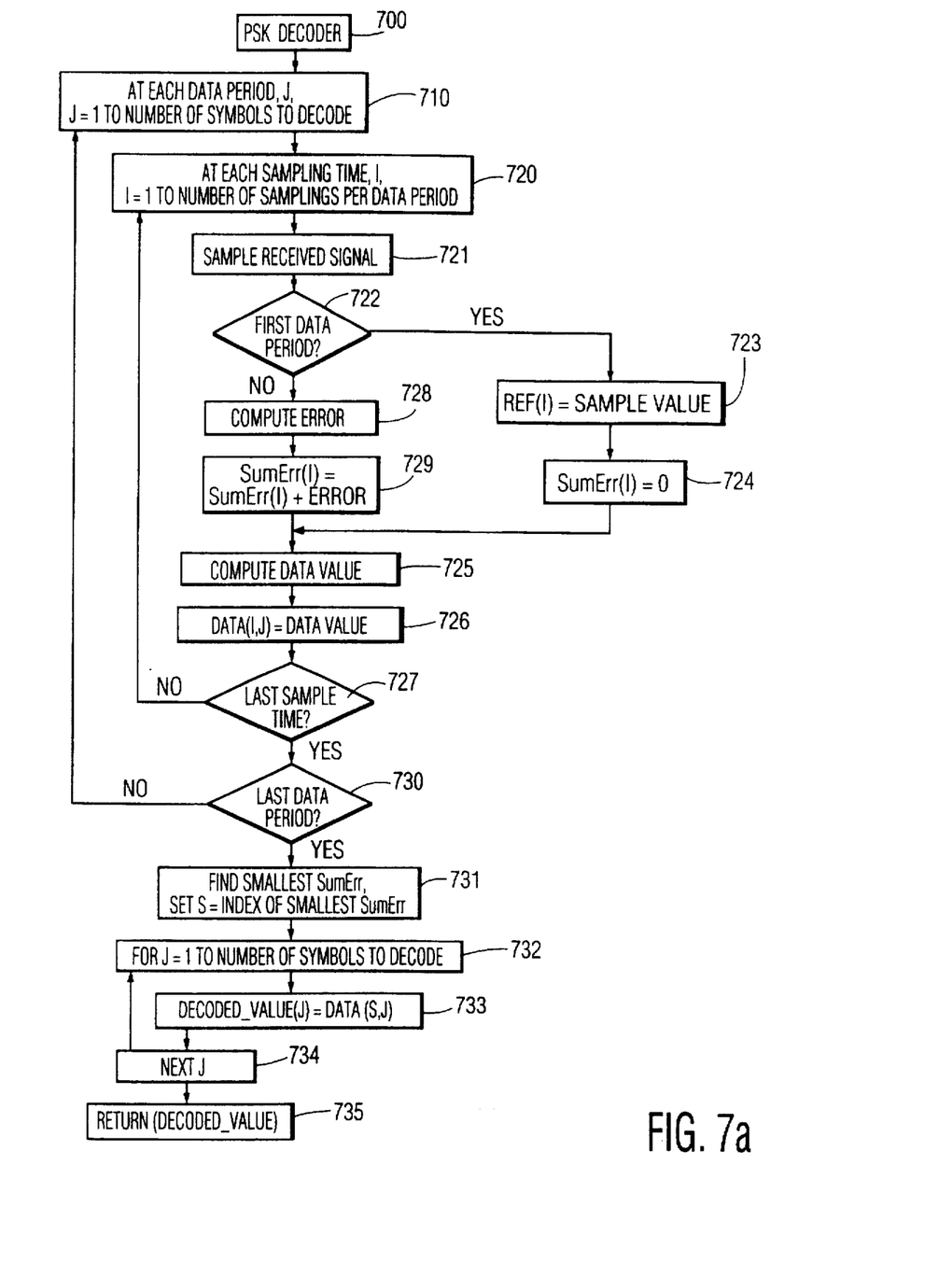
FIGS. 7 and 7B show a flowchart for demodulation in accordance with this invention.

FIG. 7 demonstrates the principle of the invention in flowchart form. As shown, the process requires the determination of an error factor which is independent of the data value. As stated above, and as exhibited in this flowchart, this error factor determination is not solely limited to measuring and comparing phase values. Items 710 and 730 form a loop for processing the data packet. Ideally, the number of symbols to decode is equal to the number of symbols in the entire packet, as previously discussed. Within each data symbol period, N samples will be taken, each at a different time within the period, corresponding, for example, to sampling periods 658, 668, 678, and 688 of FIG. 6. As previously noted, in the preferred embodiment, N is equal to 16. This sampling of the N samples is shown by item 721 within the loop formed by items 720 and 727. As shown at 722, if this is the first sample for each of the N samples, i.e. if this is the first data period, the sampled value is stored as a reference value, Ref(I), where I is the index to each of the N sampling times within the data period. Additionally, the accumulated error statistic, SumErr(I) is initialized to 0 at 724. The data value is decoded from the sampled value at 725; this decoding will be in accordance with whatever encoding scheme was employed, as would be known to one skilled in the art. For PSK demodulation, the decoding discussed above for either absolute or differential encoding would be effected in block 725. The decoded data value, for this sampling time, I, at this data period, J, is stored as Data(I,J). Subsequent samples, after the first data period, will utilize the reference sample value to determine the error associated with this sample at block 729. The determined error will be accumulated for each sampling time, I, in SumErr(I), at 729.

Figure 7B:
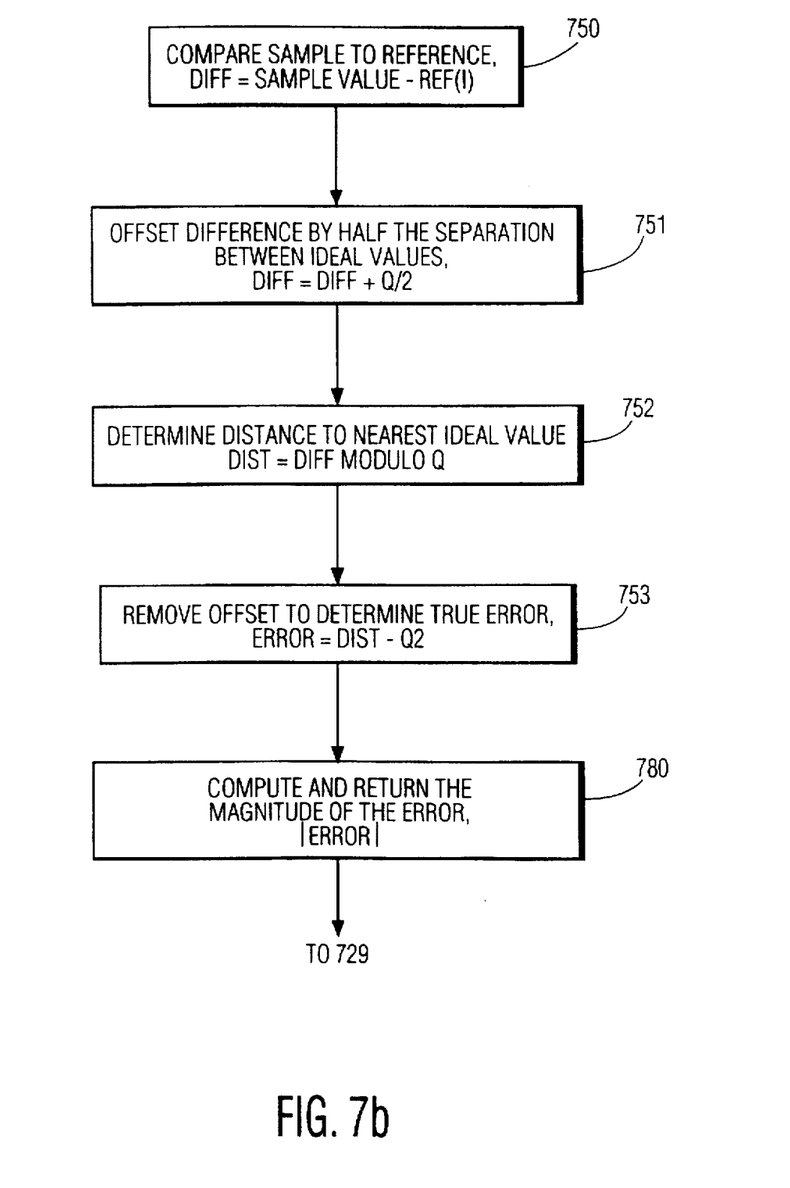

A preferred embodiment for the error determination block 728 is shown in FIG. 7b. It is assumed for this example that the encoding of the data symbols utilized a set of characteristic values which are separated by a uniform amount, Q. That is, for example, in a binary PSK encoding, the characteristic phases corresponding to data values 0 and 1 are separated by 180 degrees; thus Q would equal 180. In quadrature PSK encoding, Q is 90 degrees. The difference between the sample value and the reference value is computed in 750. This value, ideally, would be a multiple of Q. A number of alternative methods can be employed to measure the difference between this difference value and the nearest multiple of Q. As shown in blocks 751 through 753, one method is to offset the value by half Q, then perform a modulo Q operation, then remove the offset. For example, if the difference value was determined to be 85 degrees, the nearest multiple of 90 is 90, and the difference value would be −5. Utilizing the procedure as stated, 45 would be added to 85, resulting in a total of 130; 130 modulo 90 results in 40; 40 minus 45 results in −5. This −5 is the error value, as compared to the nearest multiple of 90. This value is adjusted to conform to the error accumulation means. For example, if the variance of the error is utilized to assess the accumulated error, the square of the error would be computed at 780. In the preferred embodiment, for computational ease, the sum of the magnitude of the errors is utilized as the comparable statistic, and therefor the absolute value of the error is computed at 780, and that value is returned for accumulation at block 729, as discussed above.

After all the symbols are decoded for each sampling time, the accumulated errors are compared in 731, and the index to the preferred sampling time, the one with the least accumulated error, is saved as index S. The data value decoded at this sampling time, at each data period, Data(S, J), are selected as the proper decoded values in blocks 732–734, and returned for subsequent processing at 735.

As would be evident to one skilled in the art, alternative means can be employed to effect the same results. FIG. 7 illustrates a preferred embodiment with minimal computational complexity. As would be evident to one skilled in the art, the flowchart in FIG. 7 could be implemented in hardware, or software, or a combination of both. The error computation procedure at 728 could be replaced by other algorithms, and the accumulation at 729 could be more than a mere summation operation. Similarly, the "error" measure could be a direct indication of quality, rather than the inverse of quality, and the block 731 could be modified to find the set with the highest value, rather than the smallest. For example, if the measurable characteristic were the distance, in time, from a transition, it may be preferred to choose the sampling point farthest from such transitions, i.e., having the largest accumulated distance.

What is claimed is:

1. A method for selecting the sampling point in time, relative to the start of each period of a periodic clock, for decoding a sequence of data symbols from a continuous waveform, wherein said decoding of each data symbol in the sequence is determined by the value of the continuous waveform at the selected sampling point, said method comprising the steps of:

delineating each period of said periodic clock by a set of unique points in time, relative to the start of said period, sampling said continuous waveform at each of said unique points in time within each period to obtain a discrete sample associated with each unique point in time, comparing each discrete sample to a set of ideal sample values to determine an error value associated with each unique point in time, accumulating an error statistic for each of said unique points in time based on each of said determined error values, and, selecting said sample point in time from the set of said unique points in time based upon said error statistic.

2. A method as claimed in claim 1, wherein
said continuous waveform represents a phase of a received signal,
said ideal sample values are each a different phase value, and,
each of said error values is directly proportional to the phase difference between the respective discrete sample and a one of said ideal sample values which is closest, in phase, to said discrete sample.

3. A method for decoding a packet of symbols from a received signal, based on a selection from among N alternative decodings, wherein the symbols have been encoded into a transmitted signal by setting the phase of the transmitted signal to one of Q possible encoded phase values, said transmitted signal having produced said received signal, and each symbol has a symbol period of time within said packet, said method comprising the steps of:

delineating the received signal into sampling periods S, where S is equal to the symbol period divided by N, sampling the received signal at each of the sampling periods to produce a set of measured phase values, identifying each of said measured phase values by a set index, I, which is equal to the ordinal number of this sample modulo N, and a set count, J, which is equal to the number of samples thus far obtained for this set index I, determining which of the one of Q possible encoded phase values is closest in angular measurement to each measured phase value, determining a decoded symbol value for each closest encoded phase value, storing each decoded symbol value as a J decoded sample of an I decoded set, comparing the measured phase value to the closest encoded phase value to produce the difference values, accumulating an error measure associated with the I decoded set based upon the difference values, selecting the I decoded packet to be the decoded set of symbol values which has a least error measure.

4. A method as in claim 3, further comprising the steps of
identifying a reference phase value associated with each set index I, said reference value being one of said measured phase values associated with set index I, and
adjusting each of said measured phase values of each set index I in dependence upon said reference phase value associated with said index I.

5. An apparatus for decoding a stream of data symbols from a continuous waveform, each of said data symbols having one of a limited number of discrete values, and each of said discrete values being uniquely identifiable by a characteristic of said continuous waveform,
said apparatus comprising:

means for sampling the characteristic of the continuous waveform to obtain a sample value, means for comparing the sample value to the uniquely identifiable characteristic corresponding to each of the discrete symbol values, to obtain a decoded symbol value and a difference value associated with this sample value, means for accumulating a set of decoded symbol values and an error statistic which is dependent upon said difference value, said accumulation being effected by repeated samplings at a plurality of periodic intervals of time, each of said sets being associated with the time of said samplings within said periodic intervals, means for selecting the set of decoded symbol values in dependence upon said error statistic to form the decoded stream of data symbols.

6. An apparatus as in claim 5, wherein said characteristic of said continuous waveform is a phase of the continuous waveform.

7. An apparatus as in claim 6, wherein said difference value is directly proportional to an angular distance between the sample value and the discrete symbol value which is closest, in angular distance, to said sample value.

8. An apparatus as in claim 5, wherein said error statistic is directly proportional to a sum of the magnitudes of said difference values.

9. An apparatus as in claim 6, wherein said error statistic is directly proportional to a sum of the magnitudes of said difference values.

10. An apparatus as in claim 7, wherein said error statistic is directly proportional to a sum of the magnitudes of said difference values.

11. An apparatus as in claim 5, wherein said error statistic is directly proportional to a variance of the difference values within each set.

12. An apparatus as in claim 6, wherein said error statistic is directly proportional to a variance of the difference values within each set.

13. An apparatus as in claim 7, wherein said error statistic is directly proportional to a variance of the difference values within each set.

* * * * *